(12) United States Patent
Bychkov et al.

(10) Patent No.: US 8,406,814 B2
(45) Date of Patent: Mar. 26, 2013

(54) LOW RADIATION WIRELESS COMMUNICATOR

(75) Inventors: Eyal Bychkov, Hod Hasharon (IL); Lior Storfer, Tel Aviv (IL); Itay Sherman, Hod Hasharon (IL); Hagay Katz, Moshav Herot (IL); Uriel R. Brison, Tel Aviv (IL); Uri Ron, Tel Aviv (IL); Tal Engelstein, Ramat Gan (IL); Sagiv Zeltser, Tel Aviv (IL)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/553,837

(22) Filed: Jul. 20, 2012

(65) Prior Publication Data
US 2012/0282912 A1    Nov. 8, 2012

Related U.S. Application Data

(62) Division of application No. 12/552,440, filed on Sep. 2, 2009, now Pat. No. 8,238,961.

(60) Provisional application No. 61/093,830, filed on Sep. 3, 2008.

(51) Int. Cl.
*H04B 1/38* (2006.01)
(52) U.S. Cl. .............. 455/565; 455/522; 455/569.1; 455/115.1
(58) Field of Classification Search .......... 455/69, 455/522, 115.1, 115.3, 115.4, 569.1, 556.1, 455/572.1, 565, 557, 571, 67.11, 523, 41.3, 455/13.4, 9, 73, 341, 418, 575.7, 575.1, 575.5, 455/269; 327/361, 105; 250/370.07, 394, 250/484.5; 343/841, 703, 795, 746, 745, 343/702, 860, 700 MS, 876
See application file for complete search history.

(56) References Cited

U.S. PATENT DOCUMENTS

| | | | |
|---|---|---|---|
| 5,381,086 | A | 1/1995 | Aslan |
| 5,418,448 | A | 5/1995 | Aslan |
| 5,625,673 | A | 4/1997 | Grewe et al. |
| 5,628,055 | A | 5/1997 | Stein |
| 5,809,115 | A | 9/1998 | Inkinen |
| 5,893,037 | A | 4/1999 | Reele et al. |

(Continued)

FOREIGN PATENT DOCUMENTS

| | | |
|---|---|---|
| EP | 1871075 A1 | 12/2007 |
| WO | 9421058 A1 | 9/1994 |

(Continued)

OTHER PUBLICATIONS

Hondou, T., Ueda, T., Sakata, Y., Tanigawa, N., Suzuki, T., Koboyashi, T. and Ikeda, K., Passive exposure to mobile phones: enhancement of intensity by reflection, Journal of the Physical Society of Japan, vol. 75, No. 8, Aug. 2006. http://www.cmpt.phys.tohoku.ac.jp/~hondou/JPSJ-75-084801.pdf.

(Continued)

*Primary Examiner* — Tan Trinh
(74) *Attorney, Agent, or Firm* — Soquel Group LLC

(57) ABSTRACT

A wireless communicator, including a modem operable to transmit and receive voice communication phone calls, a power amplifier coupled with the modem operable to dynamically apply a variable gain factor to voice communications transmitted by the modem, to produce an appropriate power output, and a controller coupled with the modem including a radiation monitor operable to monitor the power output of the power amplifier, the controller being operable to restrict operation of the modem, based on data provided by the radiation monitor, when the cumulative power output produced by the power amplifier exceeds a pre-designated daily cumulative power limit.

12 Claims, 7 Drawing Sheets

U.S. PATENT DOCUMENTS

| | | | |
|---|---|---|---|
| 5,907,815 A | | 5/1999 | Grimm et al. |
| 6,029,074 A | * | 2/2000 | Irvin ............................ 455/571 |
| 6,188,917 B1 | | 2/2001 | Laureanti |
| 6,195,562 B1 | | 2/2001 | Pirhonen et al. |
| 6,201,867 B1 | | 3/2001 | Koike |
| 6,243,578 B1 | | 6/2001 | Koike |
| 6,477,357 B1 | | 11/2002 | Cook |
| 6,516,202 B1 | | 2/2003 | Hawkins et al. |
| 6,553,567 B1 | * | 4/2003 | Wugofski et al. ............... 725/81 |
| 6,600,929 B1 | * | 7/2003 | Toncich et al. ................ 455/522 |
| 6,640,113 B1 | | 10/2003 | Shim et al. |
| 6,690,947 B1 | | 2/2004 | Tom |
| 6,898,283 B2 | | 5/2005 | Wycherley et al. |
| 6,907,264 B1 | | 6/2005 | Sterkel |
| 6,999,792 B2 | | 2/2006 | Warren |
| 7,085,542 B2 | | 8/2006 | Dietrich et al. |
| 7,146,139 B2 | | 12/2006 | Nevermann |
| 7,194,285 B2 | | 3/2007 | Tom |
| 7,266,391 B2 | | 9/2007 | Warren |
| 7,477,919 B2 | | 1/2009 | Warren |
| 7,499,722 B2 | | 3/2009 | McDowell et al. |
| 7,515,937 B2 | | 4/2009 | Lee |
| 7,783,318 B2 | * | 8/2010 | Wilson et al. ................. 455/522 |
| 2002/0075189 A1 | | 6/2002 | Carillo, Jr. et al. |
| 2002/0090980 A1 | | 7/2002 | Wilcox et al. |
| 2002/0151327 A1 | | 10/2002 | Levitt |
| 2004/0233930 A1 | | 11/2004 | Colby, Jr. |
| 2004/0268005 A1 | | 12/2004 | Dickie |
| 2005/0124305 A1 | | 6/2005 | Stichelbout |
| 2005/0159184 A1 | | 7/2005 | Kerner et al. |
| 2006/0003804 A1 | | 1/2006 | Liu |
| 2006/0105722 A1 | | 5/2006 | Kumar |
| 2006/0163493 A1 | | 7/2006 | Antanouski |
| 2006/0190321 A1 | | 8/2006 | Martins Nicho et al. |
| 2006/0241353 A1 | | 10/2006 | Makino et al. |
| 2007/0004450 A1 | | 1/2007 | Parikh |
| 2007/0018957 A1 | | 1/2007 | Seo |
| 2007/0079030 A1 | | 4/2007 | Okuley et al. |
| 2007/0085743 A1 | * | 4/2007 | Eberhardt et al. ..... 343/700 MS |
| 2007/0161404 A1 | | 7/2007 | Yasujima et al. |
| 2007/0241261 A1 | | 10/2007 | Wendt |
| 2007/0285326 A1 | | 12/2007 | McKinzie |
| 2007/0288583 A1 | | 12/2007 | Rensin et al. |
| 2008/0009325 A1 | | 1/2008 | Zinn et al. |
| 2008/0040354 A1 | | 2/2008 | Ray et al. |
| 2008/0076437 A1 | * | 3/2008 | Wilson et al. ................. 455/450 |
| 2008/0140886 A1 | | 6/2008 | Izutsu |
| 2008/0279359 A1 | | 11/2008 | Tiliks et al. |
| 2009/0088151 A1 | * | 4/2009 | Karabinis ..................... 455/427 |
| 2009/0243397 A1 | * | 10/2009 | Cook et al. .................... 307/104 |
| 2010/0006764 A1 | | 1/2010 | Bushberg |
| 2010/0013714 A1 | * | 1/2010 | Azhari ................... 343/700 MS |
| 2010/0013730 A1 | * | 1/2010 | Azhari ......................... 343/848 |
| 2010/0033397 A1 | * | 2/2010 | Narasimhan et al. ......... 343/860 |

FOREIGN PATENT DOCUMENTS

| | | |
|---|---|---|
| WO | 0059247 A1 | 10/2000 |
| WO | 0186922 A1 | 11/2001 |
| WO | 03103174 A1 | 12/2003 |
| WO | 2009040796 A2 | 4/2009 |
| WO | 2009101618 A1 | 8/2009 |

OTHER PUBLICATIONS

Friedman, J., Kraus, S., Hauptman, Y., Schiff, Y. and Seger, R., Mechanism of short-term ERK activation by electromagnetic fields at mobile phone frequencies, Biochem. J., vol. 405, No. 3, Aug. 1, 2007, pp. 559-568. Also Published as Manuscript BJ20061653, BJ Immediate Publication, Apr. 25, 2007. http://www.biochemj.org/bj/405/0559/4050559.pdf. http://www.radiationresearch.org/pdfs/friedman_full.pdf.

Federal Office of Public Health—Mobile Phones, Feb. 5, 2009. http://www.bag.admin.ch/themen/strahlung/00053/00673/04265/index.html?lang=en.

Kuhn, S., Cabot, E., Christ, A., Capstick, M. and Kuster, N., Assessment of the radio-frequenc electromagnetic fields induced in the human body from mobile phones user wit hands-free kits, Phys. Med. Biol., vol. 54, Aug. 26, 2009, pp. 5493-5508.

* cited by examiner

LOW RADIATION WIRELESS COMMUNICATOR

PRIORITY REFERENCE TO RELATED APPLICATIONS

This application claims benefit of U.S. Provisional Application No. 61/093,830, entitled LOW RADIATION WIRELESS COMMUNICATOR, filed on Sep. 3, 2008 by inventors Lior Storfer, Itay Sherman, Hagay Katz, Eyal Bychkov, Uriel R. Brison, Uri Ron, Tal Engelstein and Sagiv Zeltser.

FIELD OF THE INVENTION

The present invention relates to controlling radiation that is exposed to cell phone users.

BACKGROUND OF THE INVENTION

Wireless communication devices have become essential for modern day living. These devices provide many communication and data processing functions. However, there are various studies alleging that radio waves from the devices may harm body cells and damage DNA. A recent study addressing this issue was reported in Friedman, J., Kraus, S., Hauptman, Y., Schiff, Y. and Seger, R., "Mechanism of short-term ERK activation by electromagnetic fields at mobile phone frequencies, *Biochem. J.*, Vol. 5, 2007, pages 559-568. The study shows that even low levels of radiation from mobile communication devices interfere with the process of cell division, and may lead to growth of tumors.

A standard metric of radiation is the specific absorption rate (SAR). SAR is a measure of the rate at which energy is absorbed by the body when exposed to a radio frequency electromagnetic field, and is defined as the power absorbed per mass of body tissue with units of watts per kilogram. There is much advisory literature and product documentation about SAR levels of mobile phones.

It is thus of great concern to find ways to limit the potentially harmful effects of mobile communication devices, and especially for children who are becoming the largest consumer segment for mobile phones.

U.S. Pat. No. 6,195,562 to Pirhonen et al. describes restricting maximum transmitted power of a mobile communication device, based on mode of usage of the device.

U.S. Pat. No. 7,146,139 to Nevermann describes use of a sensor for reducing the SAR of a mobile communication device. The sensor detects when the mobile communication device is in proximity to a body, such as a human body, and reduces the average power of the radio frequency electromagnetic energy radiated by the device accordingly.

U.S. Pat. No. 7,499,722 to McDowell et al. describes proximity regulation with a mobile communication device. Proximity regulation uses a location sensor to determine proximity of the mobile communication device to a user based on a mode of operation of the device. A power governor is coupled to the location sensor to adjust a power level of the device, based on the proximity.

U.S. Publication No. 2005/0124305 A1 to Stichelbout describes adjusting transmission power of a mobile communication device in response to proximity of the device to a person, whereby the transmission power of the device remains in the same power class as prior to adjusting the transmission power.

International Publication WO 2009/040796 A1 to Luzzatto describes a telecommunications policy that reduces SAR by disabling a sound input and/or output channels of a mobile communication device.

International Publication WO 2009/101618 A1 to Luzzatto describes a headset that measures distance between a mobile communication device and the headset, and notifies the user so as to maintain a safe radiation range.

Most of the prior art approaches the problem of limiting radiation by adjusting power level of a radiating device. This approach has two drawbacks; namely, it is intrusive to the user, and it is not favored by mobile carriers due to connectivity issues.

SUMMARY OF THE DESCRIPTION

In order to overcome drawbacks of prior art approaches to the problem of limiting radiation exposure from mobile phones, the present invention adopts an opposite approach to the prior art; namely, maintaining power levels of a radiating device, monitoring the radiation to which a user is exposed, and adjusting the user's behavior accordingly.

Aspects of the present invention provide a method and system for lowering amounts of radiation exposed to mobile phone users, by programming the phones to prevent users from speaking with the phones near their heads for long periods of time. When radiation thresholds are exceeded, a user is limited to sending and receiving incoming and outgoing phone calls only to and from one or more pre-designated phone numbers; and is prompted to switch to a low radiation listening mode, such as listening through a hands-free speaker, or through air-tube earphones, or through such other speaker that ensures that the mobile phone is not positioned close to the user's head, in order to remove the limitation. Aspects of the present invention are of particular advantage to parents, who can use the present invention to limit the amounts of potentially harmful radiation exposed to their children.

Further aspects of the present invention limit sending and receiving phone calls when an ongoing phone call exceeds a designed time limit, and/or when signal reception is below a designated signal strength, and/or when motion above a designated speed is detected, and/or when the phone is held in the same orientation, such as near the same listening ear, longer than a designated time limit. These conditions usually indicate excessive radiation exposure.

Further aspects of the present invention calibrate radiation thresholds according to several parameters, including inter alia a user's gender, age and weight, the mobile phone's PCL class and transmission frequency, length of time the phone is used, and other audio components of the mobile phone including inter alia a speaker, an earpiece, a microphone, a hands-free headset such as a Bluetooth headset, a car kit and air-tube earphones.

There is thus provided in accordance with an embodiment of the present invention a wireless communicator, including a modem operable to transmit and receive voice communication phone calls, a power amplifier coupled with the modem operable to dynamically apply a variable gain factor to voice communications transmitted by the modem, to produce an appropriate power output, and a controller coupled with the modem including a radiation monitor operable to monitor the power output of the power amplifier, the controller being operable to restrict operation of the modem, based on data provided by the radiation monitor, when the cumulative power output produced by the power amplifier exceeds a pre-designated daily cumulative power limit.

There is additionally provided in accordance with an embodiment of the present invention a wireless communicator, including a modem operable to transmit and receive voice communication phone calls, a hands-free speaker, and a controller coupled with the modem and with the hands-free speaker, the controller being operable to direct a phone call through the hands-free speaker between the time that the phone call is made and the time when a person answers the phone call.

There is further provided in accordance with an embodiment of the present invention a wireless communicator, including a modem operable to transmit and receive voice communication phone calls, and a controller coupled with the modem including a monitor operable to monitor an ongoing call, the controller being operable to restrict operation of the modem, based on data provided by the monitor, when the ongoing phone call exceeds a pre-designated length of time.

There is yet further provided in accordance with an embodiment of the present invention a wireless communicator, including a modem operable to transmit and receive voice communication phone calls, and a controller coupled with the modem including a monitor operable to monitor reception strength of voice communication, the controller being operable to restrict operation of the modem, based on data provided by the monitor, when the reception strength is below a pre-designated threshold.

There is moreover provided in accordance with an embodiment of the present invention a wireless communicator, including a modem operable to transmit and receive voice communication phone calls, an accelerometer to measure an angle of orientation, and a controller coupled with the modem and with the accelerometer, the controller being operable to restrict operation of the modem when the accelerometer indicates a substantially stationary angle of orientation longer than a pre-designated length of time.

There is additionally provided in accordance with an embodiment of the present invention a method for limiting radiation transmitted by a wireless communicator, including monitoring power output of a wireless communicator, the wireless communicator being used to send and receive voice communication phone calls, determining if the cumulative power output exceeds a pre-designated daily cumulative power limit, and restricting operation of the wireless communicator when the determining is affirmative, including limiting usage of the wireless communicator when the wireless communicator is not being used in a low radiation listening mode.

There is further provided in accordance with an embodiment of the present invention a method for limiting radiation transmitted by a wireless communicator, including monitoring an ongoing phone call of a wireless communicator, the wireless communicator being used to send and receive voice communication phone calls, determining whether the ongoing phone call of the wireless communicator has exceeded a pre-designated length of time, and restricting operation of the wireless communicator when the determining is affirmative, including limiting usage of the wireless communicator when the wireless communicator is not being used in a low radiation listening mode.

There is yet further provided in accordance with an embodiment of the present invention a method for limiting radiation transmitted by a wireless communicator, including monitoring reception strength of voice communication of a wireless communicator, the wireless communicator being used to send and receive voice communication phone calls, determining whether the reception strength is below a designated threshold, and restricting operation of the wireless communicator when the determining is affirmative, including limiting usage of the wireless communicator when the wireless communicator is not being used in a low radiation listening mode.

There is moreover provided in accordance with an embodiment of the present invention a method for limiting radiation transmitted by a wireless communicator, including monitoring an angle of orientation of a wireless communicator, the wireless communicator being used to send and receive voice communication phone calls, determining whether the wireless communicator has been in a substantially stationary angle of orientation longer that a designated length of time, and restricting operation of the wireless communicator when said determining is affirmative, including limiting usage of the wireless communicator when the wireless communicator is not being used in a low radiation listening mode.

BRIEF DESCRIPTION OF THE DRAWINGS

The present invention will be more fully understood and appreciated from the following detailed description, taken in conjunction with the drawings in which.

DETAILED DESCRIPTION

Figure 1:
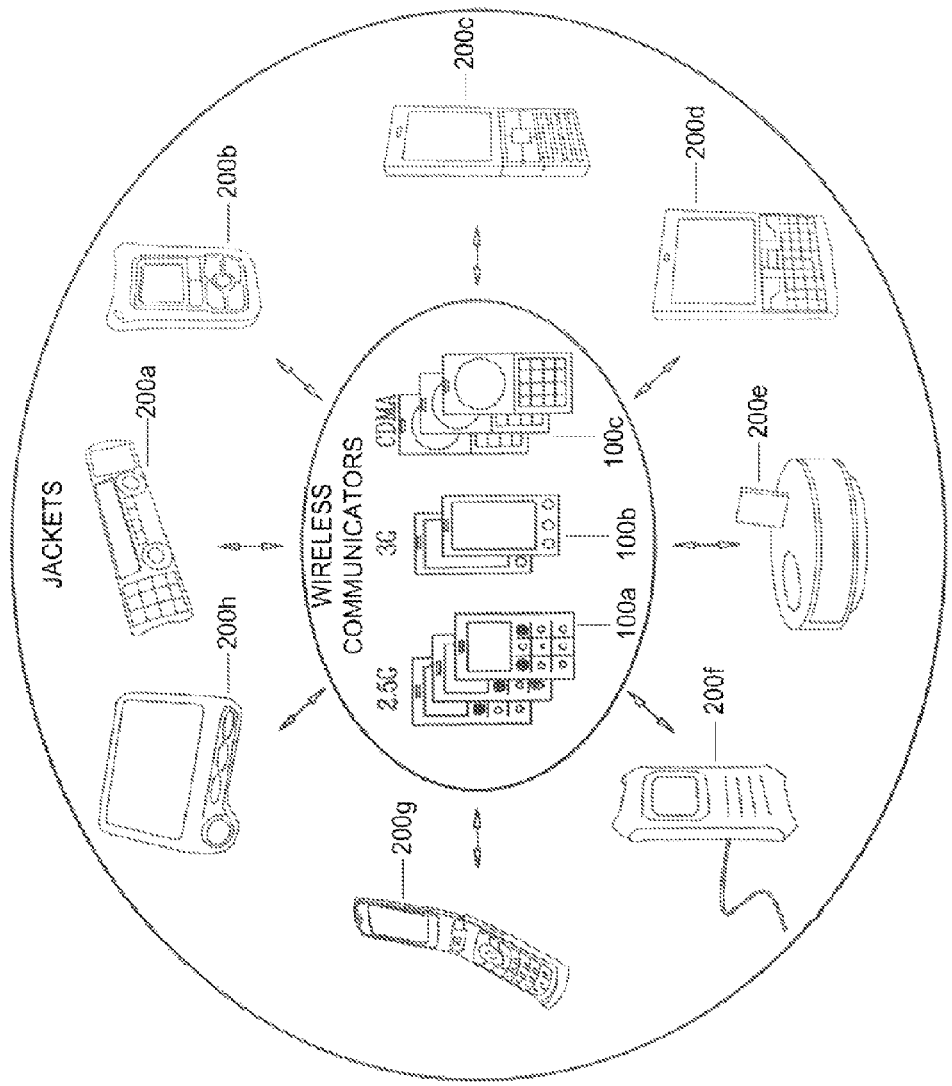
FIG. 1 is an illustration of a communication system constructed and operative in accordance with an embodiment of the present invention.

Aspects of the present invention relate to a system and method for lowering amounts of potentially harmful radiation that mobile phone users are exposed to. Embodiments of the present invention limit radiation exposure by programming mobile phones to operate in a "radiation control mode" when specific conditions occur.

When a mobile phone is in radiation control mode, a power output is monitored and used to limit the phone's usage as described below. Use of power output as a metric of radiation exposure is based on the premise that the power output of a mobile phone is directly correlated with its transmission level.

In general, for purposes of power management in a cellular network, a base station instructs mobile phones to transmit at a designated power level, by setting a parameter referred to as the "power class level" (PCL). When power management of a mobile phone is enabled, and the phone is in "dedicated mode", i.e., in use for conversation, the phone uses the PCL to control its power output level. The PCL takes integer values that correspond to specific output power levels. In low band GSM networks, such as EGSM and GSM850 networks, PCL=5 corresponds to a power level of 33 dBm (2 Watt). The actual power transmitted by the mobile phone depends on antenna efficiency, and is lower than 33 dBm As the PCL increases, the output power decreases. Each increase of PCL by one corresponds to a decrease in output power of 2 dB. Thus PCL=6 corresponds to an output power level of 31 dBm, PCL=7 corresponds to an output power level of 29 dBm, etc., through PCL=19 which corresponds to an output power level of 5 dBm.

The power output correlates directly with the SAR; as the power output increases the SAR increases, and as the power output decreases the SAR decreases.

When a mobile phone is in "idle mode", i.e., not being used for conversation, the phone transmits only periodically, and power management may not be implemented due to short transmission times. However, short transmissions generate only negligible radiation exposure. Transmissions in idle mode are generally performed when the mobile phone is turned on or turned off, when a periodic update occurs, and when a location update occurs. The frequency of periodic updates depends on the network protocol, and is generally on the order of one update per two or three hours.

In accordance with an embodiment of the present invention, when the mobile phone is in radiation control mode, a pre-designated transmission limit is enforced. The radiation control mode is specified in terms of (i) a pre-designated "daily cumulative power limit", and (ii) one or more pre-designated phone numbers such as parents' phone numbers, emergency numbers and speed-dial numbers. The daily cumulative Power limit is an upper limit, PTOTAL, on total power output, $$P = \int PCL(t) I(t) dt, \quad (1)$$

where PCL(t) denotes the power class level at time t, and I(t) is a weighting function that ranges between 0 and 1 depending on how the user is listening to the mobile phone at time t, as described hereinbelow. It will be appreciated by those skilled in the art that the daily cumulative power limit may be an upper limit on a different measure of power output, instead of the integral in Eq. (1), such as a weighted integral of PCL(t), or such other measure. Similarly, the upper limit may be an hourly limit, or such other time span, instead of a daily limit.

The daily cumulative power limit may specify, for example, an upper limit PTOTAL=600 dBm-min. which corresponds to, say, a power output of 20 dBm during 30 minutes when the mobile phone's internal speaker is being used and the mobile phone is likely positioned close to the user's head. When the daily cumulative power limit is reached, the mobile phone is only operative to make and receive calls from the pre-designated one or more phone numbers and emergency phone numbers.

In an embodiment of the present invention, when the pre-designated daily cumulative power limit is reached, the mobile phone user is only enabled to continue speaking using a "low radiation listening mode". A low radiation listening mode includes listening with a hands-free speaker, with air-tube earphones, or with such other designated speaker or headset that ensures that the phone is not near the user's head. In accordance with an embodiment of the present invention, the user is able to designate a list of one or more listening devices that are permitted in low radiation listening mode, and to modify the list from time to time.

The weighting function I(t) in Eq. (1) is generally defined in terms of parameters of the listening device being used at time t, including inter alia the SAR of the listening device. For example, I(t)=1 if the user is listening to the mobile phone through its internal speaker at time t, I(t)=0 if the user is listening to the mobile phone using a hands-free headset at time t, and I(t) is between 0 and 1 if the user is listening to the mobile phone using earphones, Bluetooth headset or such other listening device at time t. The weighting function I(t) may also depend on the SAR of the mobile phone itself.

In accordance with an embodiment of the present invention, an alert is made when the pre-designated daily cumulative power limit is reached. The alert may be aural, visual or tactile such as by vibrating. The alert informs the user that he has 60 seconds, or such other relatively short time limit, to continue speaking after which the call will be disconnected unless the call is continued in a low radiation listening mode.

In accordance with another embodiment of the present invention, additional restrictions are applied, to reduce potential harm caused by exposure to radiation. One such restriction is limiting the length of a call. Prior to reaching the pre-designated daily cumulative power limit, the mobile phone restricts conversations that are longer than a pre-designated length of time, unless the mobile phone is used in a low radiation listening mode. The mobile phone prompts a user to switch the call to a low radiation listening mode when the designated length of time for the call is reached. This restriction is based on the premise that heat generated by a mobile phone is hazardous, and thus, for example, three conversations of two minutes' duration may be safer than one conversation of six minutes' duration.

Another such restriction requires the user to move his phone from his right ear to his left ear, or vice versa, after a pre-designated length of time. The mobile phone prompts the user to switch listening ear by generating a beep tone. The mobile phone employs an accelerometer, or such other device that measures an angle of orientation of the mobile phone, to detect when the user has switched listening ear.

Another such restriction imposes a lower bound on reception strength, below which the mobile phone does not transmit. In areas of poor reception, such as elevators and basements, signals sent and received have above average intensities. Moreover, in closed conducting spaces, such as elevators and cars, radiation exposure is increased due to reflections. In such poor reception areas, the person on the other side of the call is generally not properly heard. As such, stopping transmission in poor reception areas serves to reduce unnecessary radiation.

In accordance with another embodiment of the present invention, the mobile phone is automatically switched to a low radiation listening mode, if not already in such mode, during the time interval from when a phone number is dialed until the time when the person called answers the phone. Upon the person's answering the call, the mobile phone returns to its previous listening mode. As such, radiation exposure is reduced while a user is waiting for someone to answer a call.

In one embodiment of the present invention, a mobile phone includes an application that locks the phone in the radiation control mode. Locking may be performed inter alia by entering a password.

In another embodiment, the present invention involves a modular communicator and a "jacket" therefor. A jacket is a device that provides a user interface for the communicator, enriches the capabilities of the communicator, and is not able to operate independently when the communicator is not connected thereto. The modular communicator inserts inside a cavity of the jacket. When inserted, the modular communicator provides the jacket with wireless modem capability, and the jacket provides the modular communicator with a user interface.

In accordance with an embodiment of the present invention, when the modular communicator is inserted into the jacket, the communicator automatically sets itself to radiation control mode. The communicator may be locked inside the jacket so that a child cannot extract it and use it without parental control.

Reference is now made to FIG. 1, which is an illustration of a communication system constructed and operative in accordance with an embodiment of the present invention. Shown in FIG. 1 are a plurality of communicators 100a-100c, including 2.5 G communicators for a GSM network, 3G communicators for GSM network, and CDMA communicators for a CDMA network. It will be appreciated by those skilled in the art that the networks illustrated in FIG. 1 are exemplary of a wide variety of networks and communication protocols that are supported by the communicators of the present invention, such networks and communication protocols including inter alia WiFi, Bluetooth and WiMax.

Also shown in FIG. 1 is a plurality of jackets 200a-200h. In accordance with an embodiment of the present invention, each communicator 100a-100c may be connected to any of jackets 200a-200h, so as to operate in combination therewith. Communicators 100a-100c are substantially of the same form factor and, as such, are able to be connected to each of jackets 200a-200h.

Figure 2:
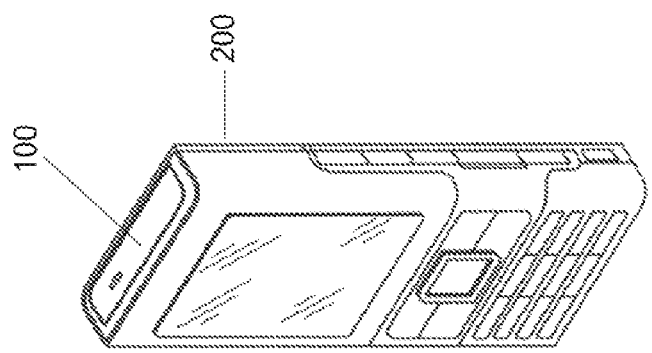
FIG. 2 is an illustration of a wireless communicator being inserted into a jacket, in accordance with an embodiment of the present invention.
Figure 2:
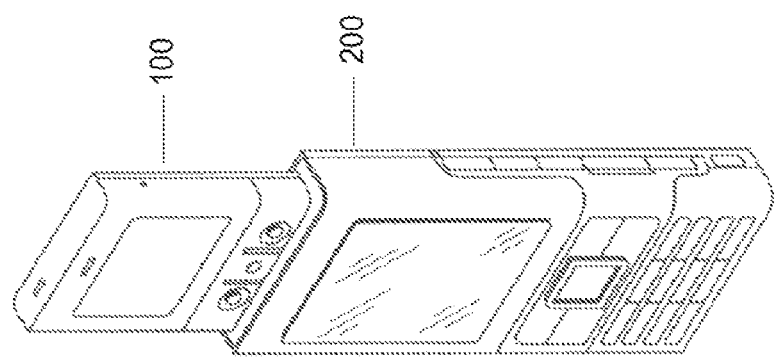
Figure 2:
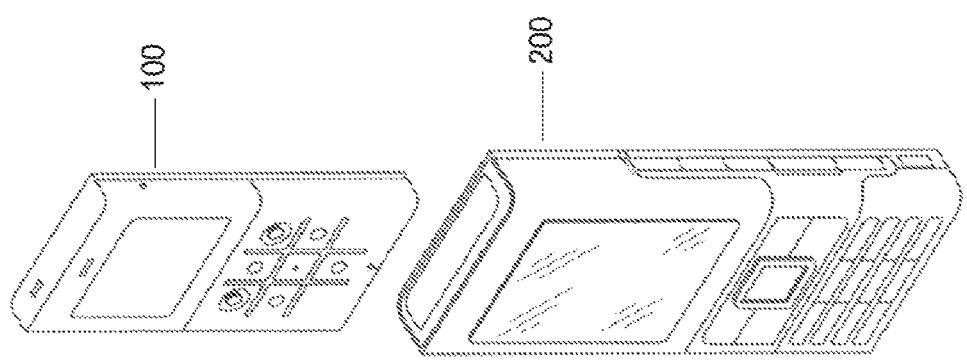

Reference is further made to FIG. 2, which is an illustration of a wireless communicator 100 being inserted into a jacket 200, in accordance with an embodiment of the present invention. Jacket 200 as shown in FIG. 2 includes a hollow cavity at the top for insertion of communicator 100 therein.

Figure 3:
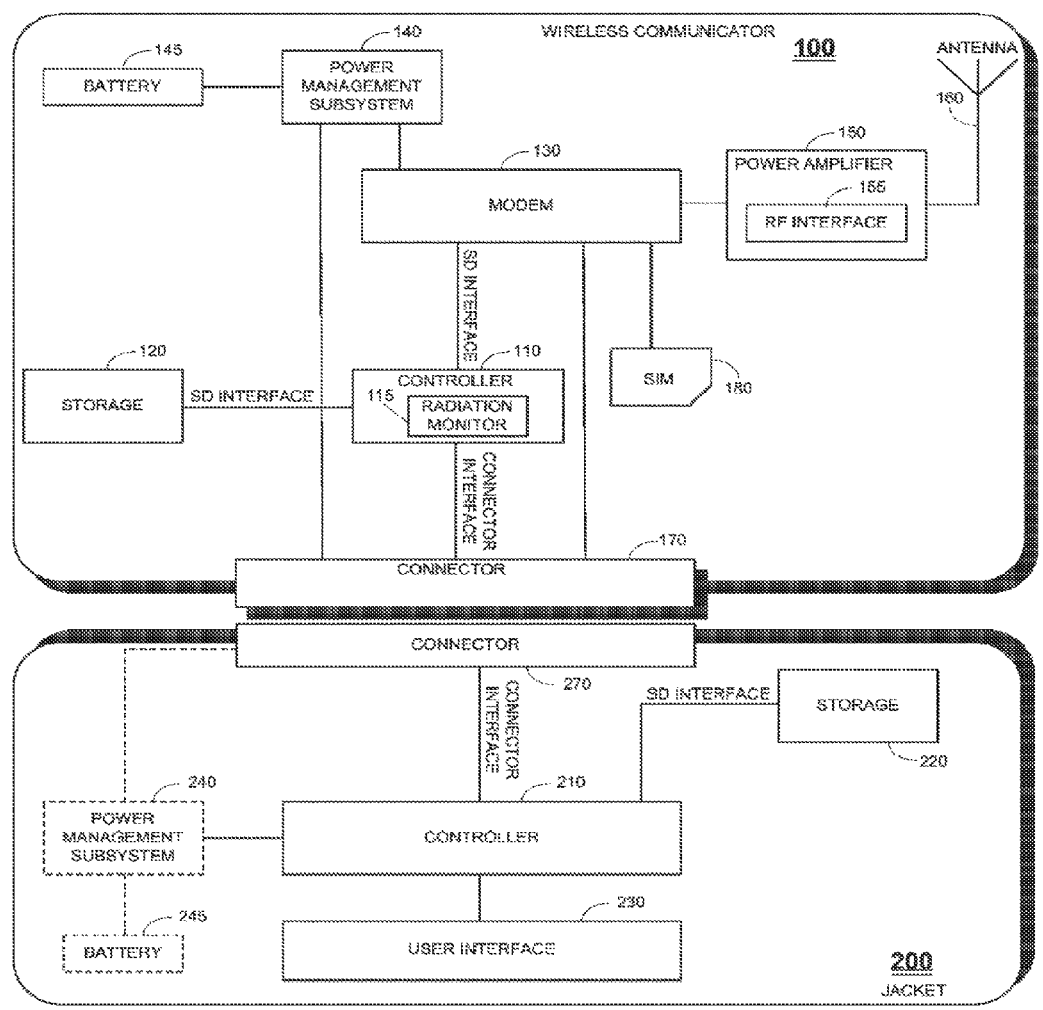
FIG. 3 is a simplified block diagram of a wireless communicator with radiation exposure monitoring and control functionality, in accordance with an embodiment of the present invention.

Reference is now made to FIG. 3, which is a simplified block diagram of a wireless communicator with radiation exposure monitoring and control functionality, in accordance with an embodiment of the present invention. Wireless communicator 100 includes eight primary components, as follows: a controller 110, a memory storage 120, a modem 130 for sending and receiving voice communications, a power management subsystem 140, a power amplifier 150, an antenna 160, a connector 170 for connecting the wireless communicator to jacket 200, and a subscriber identification module (SIM) 180. In some embodiments of the present invention, power amplifier 150 is embedded in modem 130 as a pre-amplifier.

Controller 110 executes programmed instructions that control modem 120 and that control the data flow between wireless communicator 100 and jacket 200.

Modem 120 performs the communication functionality of wireless communicator 100. Power management subsystem 140 includes charging circuitry for charging a battery 145. Power amplifier 150 includes a radio frequency (RF) interface 155, and is connected to antenna 160.

In accordance with an embodiment of the present invention, controller 110 includes a radiation monitor 115, which monitors the power output of power amplifier 150. Radiation monitor 115 determines the power output based on the PCL setting obtained from modem 120, as described hereinabove. Radiation monitor 115 may be a software application executed by controller 110.

In accordance with an embodiment of the present invention, the interface between controller 110 and storage 120, and the interface between controller 110 and modem 130 are both SD interfaces. The interface between controller 110 and connector 170 is a custom interface.

It will be appreciated by those skilled in the art that controller 110 may be embodied as a hardware device, or alternatively controller 110 may be embodied as a software controller.

Jacket 200 includes four primary components, as follows: a controller 210, a memory storage 220, a user interface 230 and a connector 270, for connecting the jacket to wireless communicator 100. Jacket 200 may include an optional power management subsystem 240, and an optional battery 245.

User interface 230 may include one or more optional interface components (not shown), including inter alia a microphone, a headset audio jack, an earpiece, a mono speaker or stereo speakers, a vibrator, a keyboard and a display.

In accordance with an embodiment of the present invention, the interface between controller 210 and storage 220 is an SD interface. The interface between controller 210 and connector 270 is a custom interface.

Figure 4:
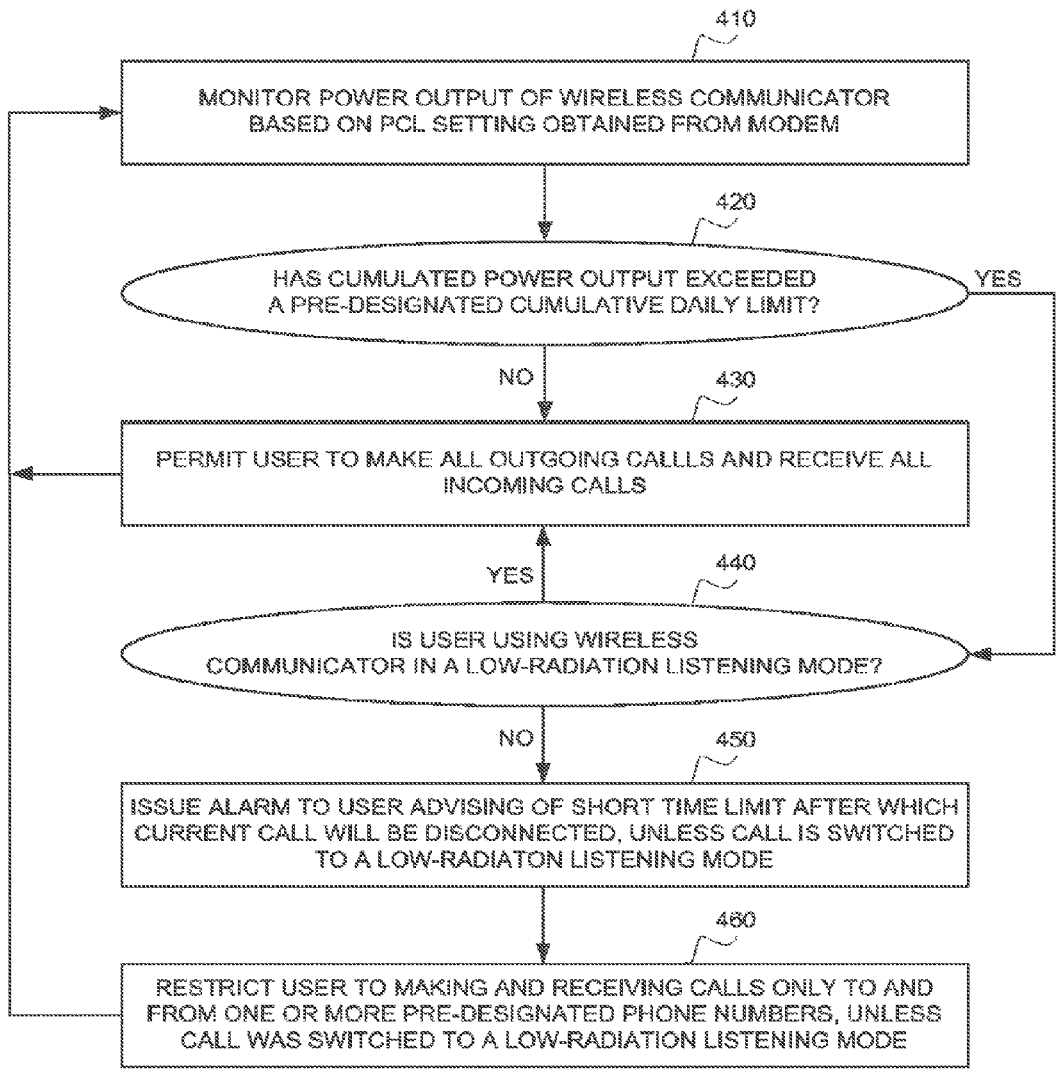
FIGS. 4-7 are simplified flowcharts of methods for monitoring and controlling radiation exposure from a wireless communicator, in accordance with an embodiment of the present invention.

Reference is now made to FIG. 4, which is a simplified flowchart of a method for monitoring and controlling radiation exposure from a wireless communicator, in accordance with an embodiment of the present invention. The steps shown in FIG. 4 are performed by a wireless communicator with radiation exposure monitoring and control functionality, such as wireless communicator 100 shown in FIG. 3.

At step 410 radiation monitor 115 monitors the power output of power amplifier 150. The power output is determined from the PCL setting, obtained from modem 120, as described hereinabove. At step 420 controller 110 determines whether or not the cumulative power amplifier output has exceeded a pre-designated daily cumulative power limit. If not, then at step 430 controller 110 permits a user of wireless communicator 100 to continue making all outgoing calls and to continue receiving all incoming calls, and processing returns to step 410 for further monitoring.

If controller 110 determines at step 420 that the pre-designated daily cumulative power limit has been exceeded, then at step 440 controller 110 further determines whether the user is operating wireless communicator 100 in a low radiation listening mode, such as listening through a hands-free speaker or through air tube earphones. If so, then processing returns to step 430 and the user is permitted to continue making all outgoing calls and receiving all incoming calls.

If controller 110 determines at step 440 that wireless communicator 100 is not being used in a low radiation listening mode, then at step 450 controller 110 issues an alarm advising the user that the current call will be disconnected after a short time period, unless the user switches to a low radiation listening mode. After the short time period has expired, at step 460, unless the user switched to a low radiation listening mode, controller 110 disconnects the current call and restricts the user to only making calls to one or more pre-designated phone numbers and to only receiving calls from one or more pre-designated phone numbers.

The daily cumulative power limit used at step 420 may be calibrated according to one or more parameters that affect radiation. In accordance with an embodiment of the present invention, the user enters his gender, his age and his weight. If the user is a female, the user may also enter whether or not she is pregnant. Alternatively, someone else, such as the user's parents or spouse, may enter these parameters on behalf of the user. These parameters impact the amount of radiation absorbed by the user, and the daily cumulative power limit is accordingly based upon them.

It will be appreciated by those skilled in the art that different mobile phones may have different SAR profiles, depending upon the phone's antenna. The daily cumulative power limit may thus also be based upon the frequency band (e.g., 850 MHz, 900 MHz, 1800 MHz, 1900 MHz) used by the mobile phone.

As such, the daily cumulative power limit may be determined as a function of user parameters including inter alia gender, age and weight, and network/phone parameters including inter alia usage time, PCL and frequency band. Moreover, when wireless communicator 100 is used with one or more jackets 200 (FIG. 3), each jacket 200 may have its own SAR profile. As such, the daily cumulative power limit is also a function of the jacket SAR profile. The SAR profiles of the different jackets 200 may be determined by a-priori testing.

Further in accordance with an embodiment of the present invention, the mobile phone may include additional audio input/output components, which are also factored into calibration of the daily cumulative power limit. Such audio components include inter alia a speaker, an earpiece, a microphone, a hands-free headset such as a Bluetooth headset, a car kit and air-tube earphones.

In accordance with an embodiment of the present invention, the mobile phone notifies the user of the amount of SAR he has been exposed to.

It will be appreciated by those skilled in the art that the flowchart of FIG. 4 may be adapted to other radiation-related restrictions, in addition to or instead of a cumulative power output limit. As mentioned hereinabove, restrictions may be placed on length of an ongoing call, reception strength, stationary orientation of a mobile phone near a listening ear, and other such restrictions.

Figure 5:
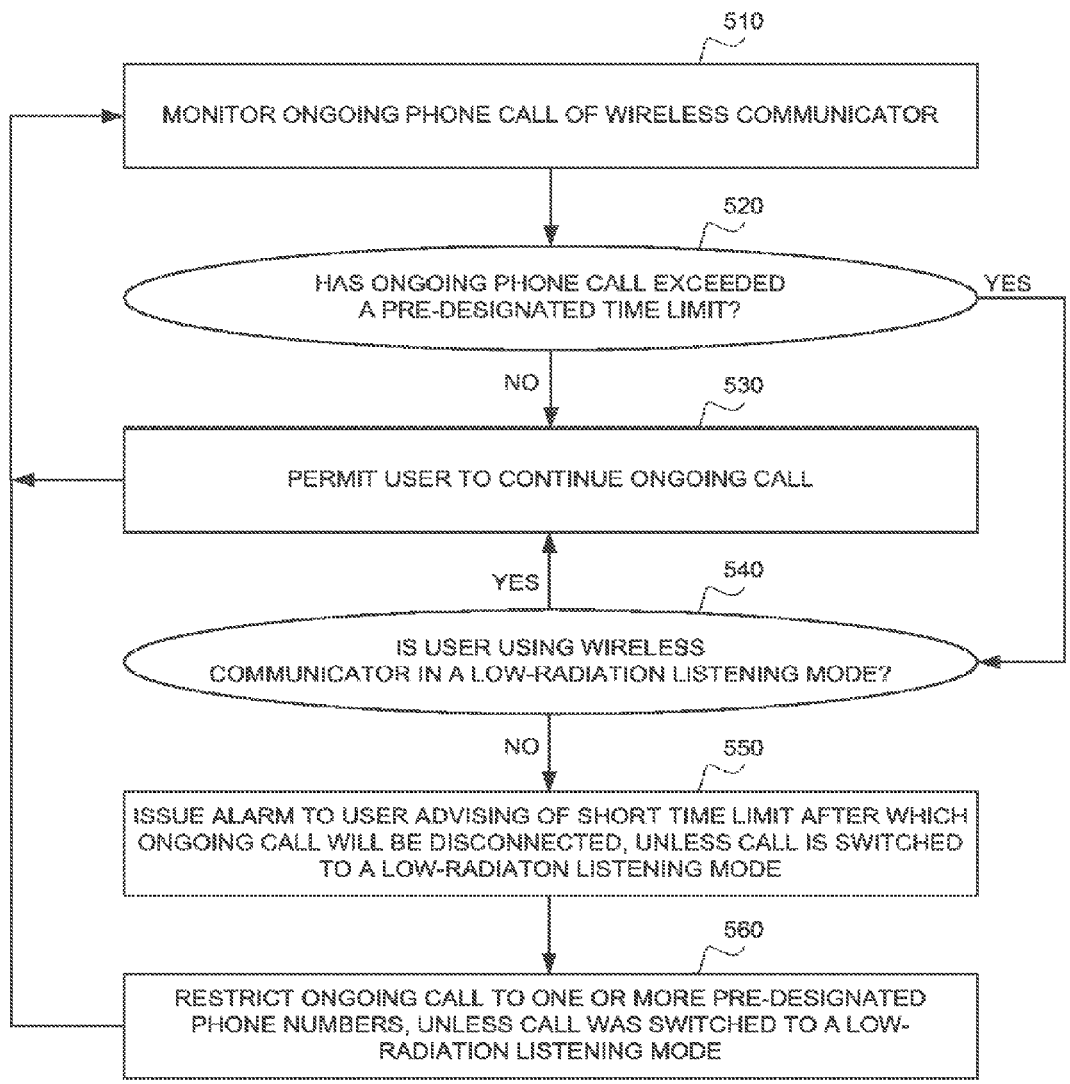
Figure 6:
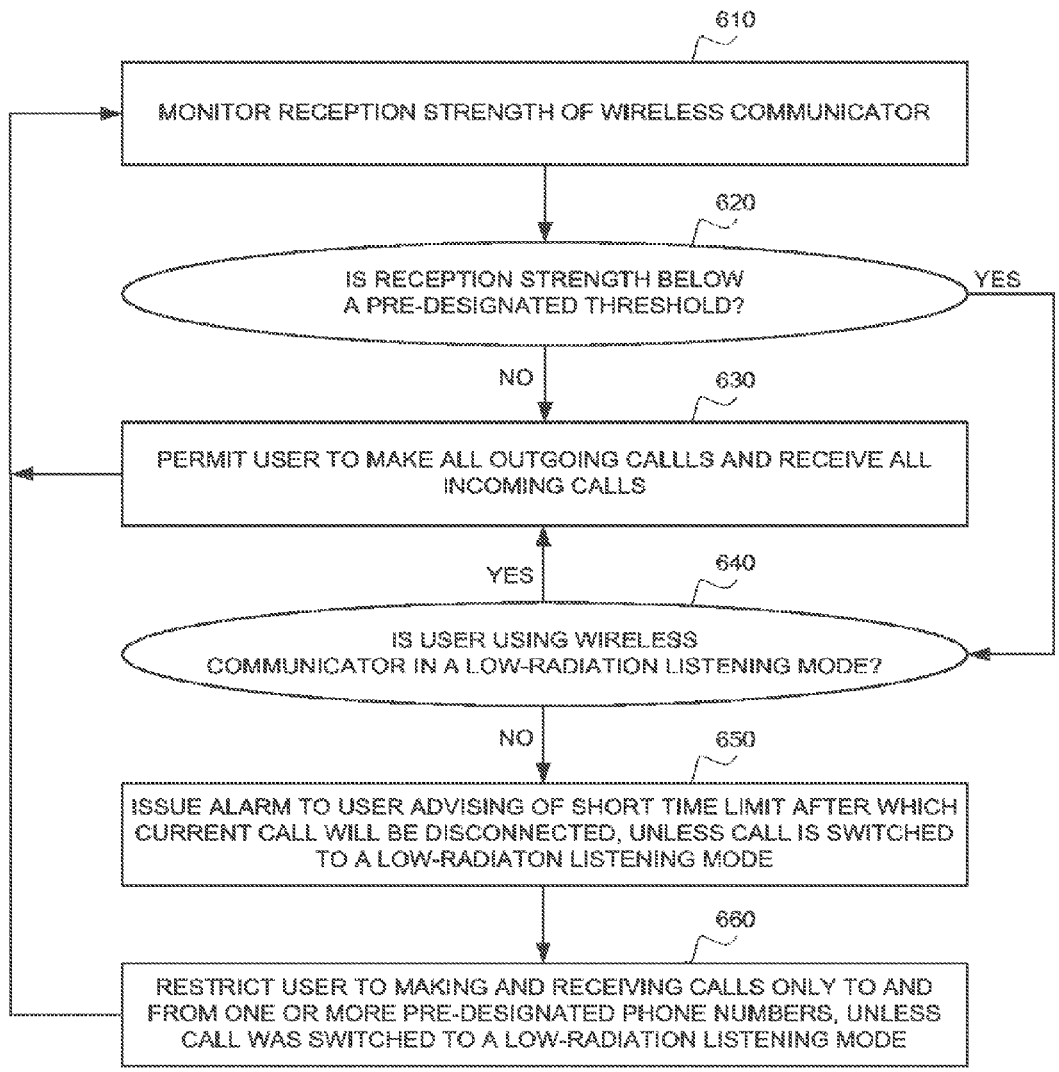
Figure 7:
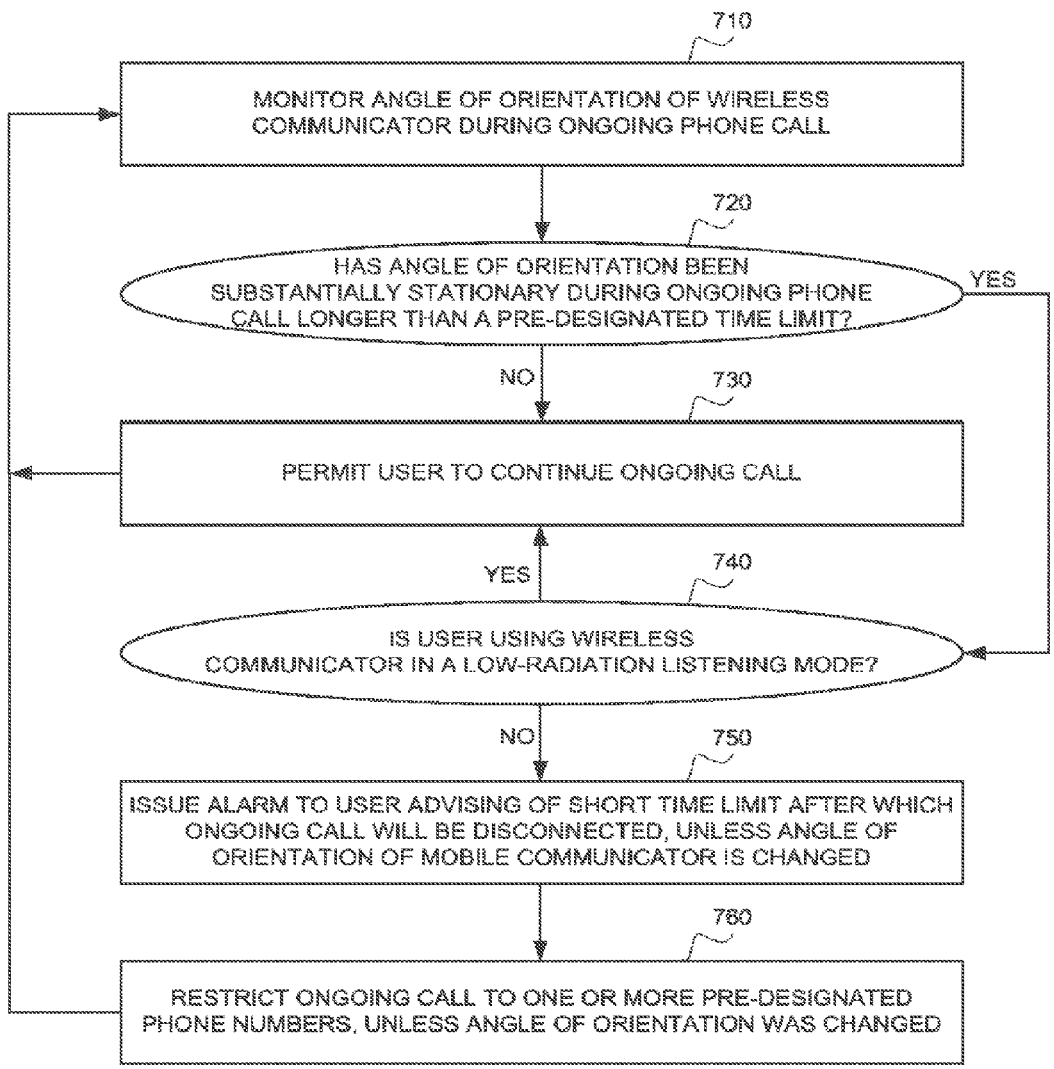

Reference is made to FIGS. 5-7, which are simplified flowcharts of other methods for monitoring and controlling radiation exposure from a wireless communicator, in accordance with an embodiment of the present invention. Referring to FIG. 5, at step 510 the wireless communicator monitors an ongoing phone call. At step 520 the wireless communicator determines whether or not the ongoing phone call has exceeded a pre-designate time limit. If not, then at step 530 the wireless communicator permits a user to continue the ongoing call, and processing returns to step 510 for further monitoring.

If the wireless communicator determines at step 520 that the ongoing phone call has exceeded the pre-designated time limit, then at step 540 the wireless communicator further determines whether the user is operating the wireless communicator in a low radiation listening mode, such as listening through a hands-free speaker or through air tube earphones. If so, then processing returns to step 530 and the user is permitted to continue the ongoing call.

If the wireless communicator determines at step 540 that the wireless communicator is not being used in a low radiation listening mode, then at step 550 the wireless communicator issues an alarm advising the user that the ongoing call will be disconnected after a short time period, unless the user switches to a low radiation listening mode. After the short time period has expired, at step 560, unless the user switched to a low radiation listening mode, the wireless communicator disconnects the ongoing call unless the ongoing call is with one or more pre-designated phone numbers.

Referring to FIG. 6, at step 610 a wireless communicator monitors its signal reception strength. At step 620 the wireless communicator determines whether or not its reception strength is below a pre-designated threshold. If not, then at step 630 the wireless communicator permits a user to continue making all outgoing calls and to continue receiving all incoming calls, and processing returns to step 610 for further monitoring.

If the wireless communicator determines at step 620 that its reception strength is below the pre-designated threshold, then at step 640 the wireless communicator further determines whether the user is operating the wireless communicator in a low radiation listening mode, such as listening through a hands-free speaker or through air tube earphones. If so, then processing returns to step 630 and the user is permitted to continue making all outgoing calls and receiving all incoming calls.

If the wireless communicator determines at step 640 that it is not being used in a low radiation listening mode, then at step 650 the wireless communicator issues an alarm advising the user that the current call will be disconnected after a short time period, unless the user switches to a low radiation listening mode. After the short time period has expired, at step 660, unless the user switched to a low radiation listening mode, the wireless communicator disconnects the current call and restricts the user to only making calls to one or more pre-designated phone numbers and to only receiving calls from one or more pre-designated phone numbers.

Referring to FIG. 7, at step 710 the wireless communicator monitors its angle of orientation during an ongoing phone call. Wireless communicator may use an accelerometer to measure its angle of orientation, or such other orientation sensing device. A substantially stationary angle of orientation is an indicator that the wireless communicator has likely been held next to the same listening ear. At step 720 the wireless communicator determines whether or not its angle of orientation has been substantially stationary during the ongoing call longer than a pre-designated time limit. If not, then at step 730 the wireless communicator permits a user to continue the ongoing call, and processing returns to step 710 for further monitoring.

If the wireless communicator determines at step 720 that the angle of orientation has been substantially stationary during the ongoing call longer than the pre-designated time limit, then at step 740 the wireless communicator further determines whether the user is operating the wireless communicator in a low radiation listening mode, such as listening through a hands-free speaker or through air tube earphones. If so, then processing returns to step 730 and the user is permitted to continue the ongoing call.

If the wireless communicator determines at step 740 that the wireless communicator is not being used in a low radiation listening mode, then at step 750 the wireless communicator issues an alarm advising the user that the ongoing call will be disconnected after a short time period, unless the angle of orientation of the wireless communicator is substantially changed. After the short time period has expired, at step 760, unless the user substantially changed the wireless communicator's angle of orientation, the wireless communicator disconnects the ongoing call unless the ongoing call is with one or more pre-designated phone numbers.

In reading the above description, persons skilled in the art will realize that there are many apparent variations that can be applied to the methods and systems described. On such variation is use of discontinuous transmission (DTX) to reduce the amount of radiation transmitted by a mobile phone. Specifically, when the pre-designated daily cumulative power limit of a mobile phone is exceeded, the voice activity detection threshold is adjusted to reduce the phone's transmission.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method for limiting radiation transmitted by a wireless communicator, comprising:
monitoring power output of a wireless communicator, the wireless communicator being used to send and receive voice communication phone calls;
determining if the cumulative power output exceeds a pre-designated daily cumulative power limit; and
restricting operation of the wireless communicator when said determining is affirmative, comprising limiting usage of the wireless communicator when the wireless communicator is not being used in a low radiation listening mode.

2. The method of claim 1 wherein the low radiation listening mode comprises using the wireless communicator with a hands-free speaker.

3. The method of claim 1 wherein the low radiation listening mode comprises using the wireless communicator with a low radiation headset.

4. The method of claim 3 wherein the low radiation Headset includes air-tube earphones.

5. The method of claim 3 wherein the low radiation headset includes wired earphones.

6. The method of claim 3 wherein the low radiation Headset includes a Bluetooth headset.

7. The method of claim 1 wherein said limiting usage of the wireless communicator includes restricting incoming and outgoing phone calls sent and received by the wireless communicator to one or more pre-designated phone numbers.

8. The method of claim 7 wherein the one or more pre-designated phone numbers comprise emergency phone numbers.

9. The method of claim 7 wherein the one or more pre-designated phone number comprise phone numbers of parents of a child who uses the wireless communicator.

10. The method of claim 1 further comprising issuing an alarm advising a user that a current call will be disconnected unless the user switches the wireless communicator to the low radiation listening mode.

11. The method of claim 1 further comprising calibrating the pre-designated daily cumulative power limit according to a user's gender, age and weight.

12. The method of claim 1 further comprising directing a phone call through a hands-free speaker between the time that the phone call is made and the time when a person answers the phone call.

* * * * *